J. M. M. TRUFFAULT.
SHOCK ABSORBER.
APPLICATION FILED JUNE 24, 1916.

1,253,648.

Patented Jan. 15, 1918.
3 SHEETS—SHEET 1.

Inventor
Jules Michel Marie Truffault
Attorney

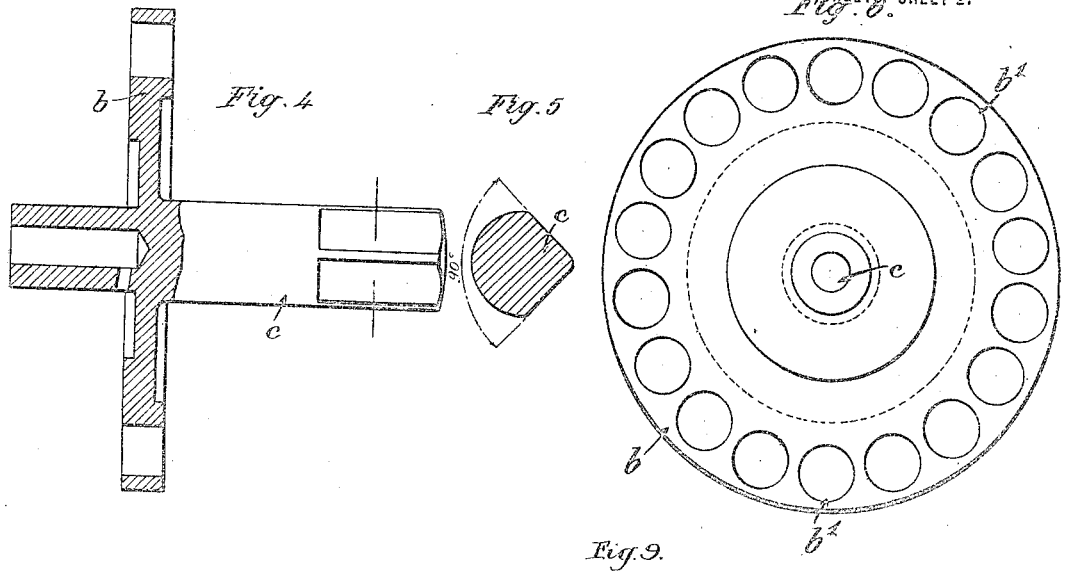
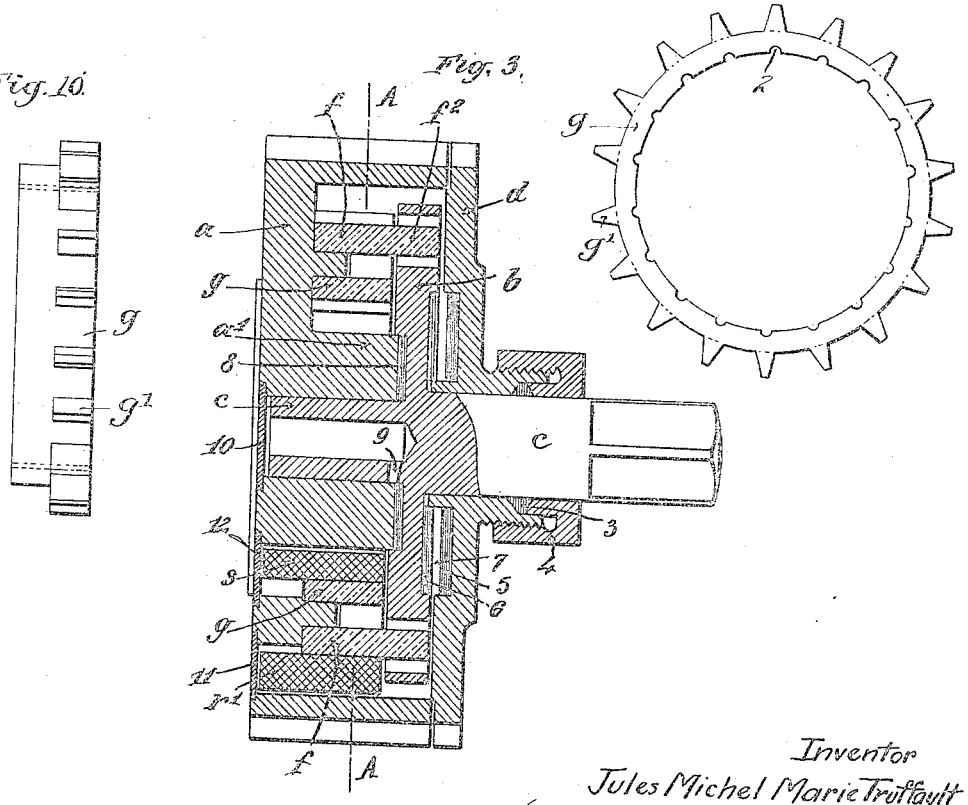

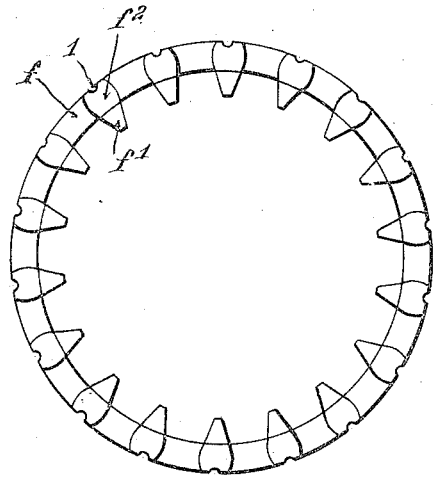
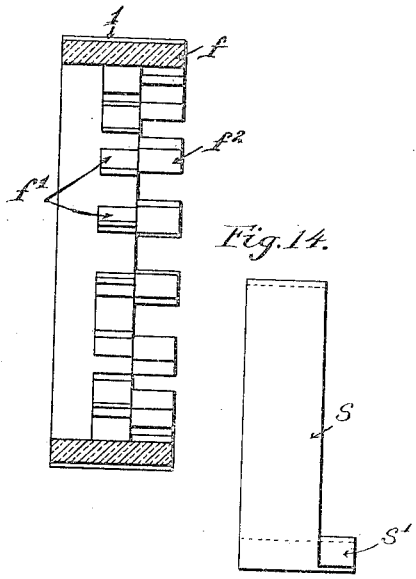
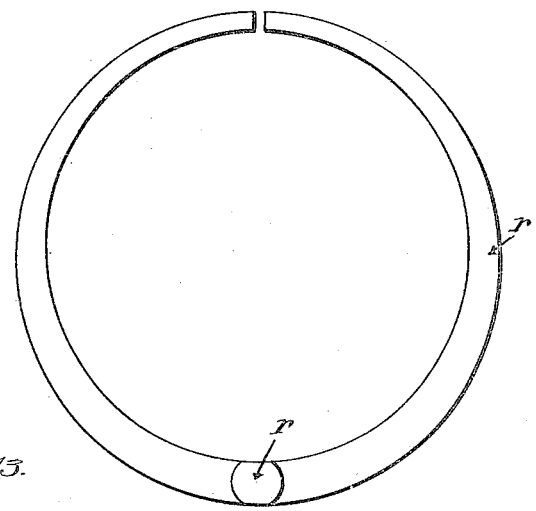
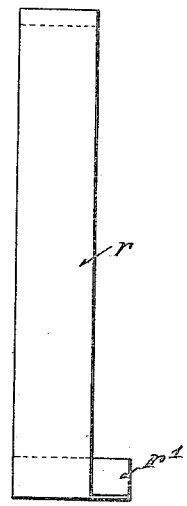
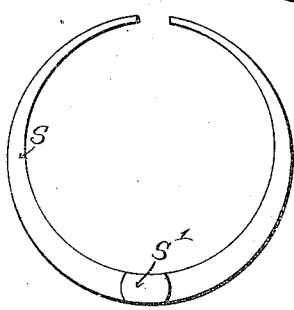

UNITED STATES PATENT OFFICE.

JULES MICHEL MARIE TRUFFAULT, OF PARIS, FRANCE, ASSIGNOR TO SOCIETE ANONYME DES AUTOMOBILES ET CYCLES PEUGEOT, OF PARIS, FRANCE.

SHOCK-ABSORBER.

1,253,648.  Specification of Letters Patent.  Patented Jan. 15, 1918.

Application filed June 24, 1916. Serial No. 105,549.

*To all whom it may concern:*

Be it known that I, JULES MICHEL MARIE TRUFFAULT, a citizen of the Republic of France, residing at 51 Avenue des Ternes, Paris, in the Republic of France, have invented new and useful Improvements in Shock-Absorbers, of which the following is a specification.

The subject of this invention is an improved shock absorber for automobiles or other suspended vehicles, of which the features are pointed out in the course of the following description.

The annexed drawing represents a form of construction of the shock absorber.

Fig. 3 is a section through the axis on the line B—B of Fig. 1;

Figs. 4 to 14 represent in detail certain essential members of the shock absorber;

Figs. 4, 5 and 6 show in longitudinal section, cross section and elevation the axle of the shock absorber with its driving disk.

Figs. 7 and 8 show in elevation and in section the outer toothed crown wheel with inner toothing and tenons and Figs. 9 and 10 represent likewise in elevation and in section the inner toothed crown-wheel with outer toothing;

Figs. 11–12 and 13–14 represent respectively in front view and side view the large segment-brake which corresponds to the large toothed crown-wheel and the small segment-brake which corresponds to the small toothed crown-wheel.

The apparatus essentially comprises a cylindrical box or shell $a$ which is fixed on the long bar of the car frame and a disk $b$ integral with an axle $c$ on which is fixed on the outside the lever arm connected with the shaft by a connecting rod. The disk $b$ engages in the box $a$ in which it is centered and guided by the inner end of the axle $c$ and it is then covered by the lid $d$ which is fixed by means of screws to the box $a$ so as to close the latter hermetically. The axle $c$ passes through the lid through a joint and it is outside this lid that it receives the lever connected with the shaft.

Figure 1:
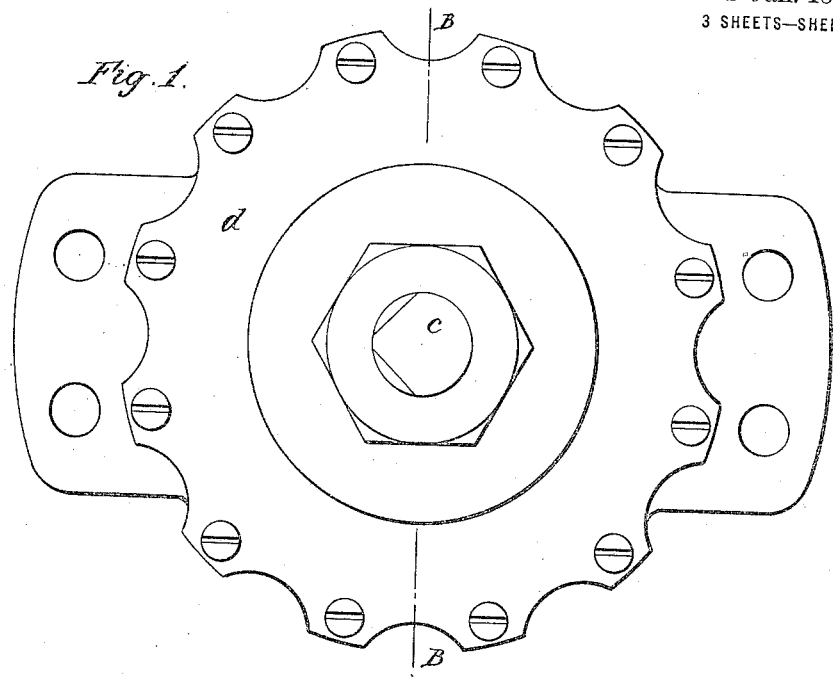
Figure 1 is an outer view of the apparatus.
Figure 2:
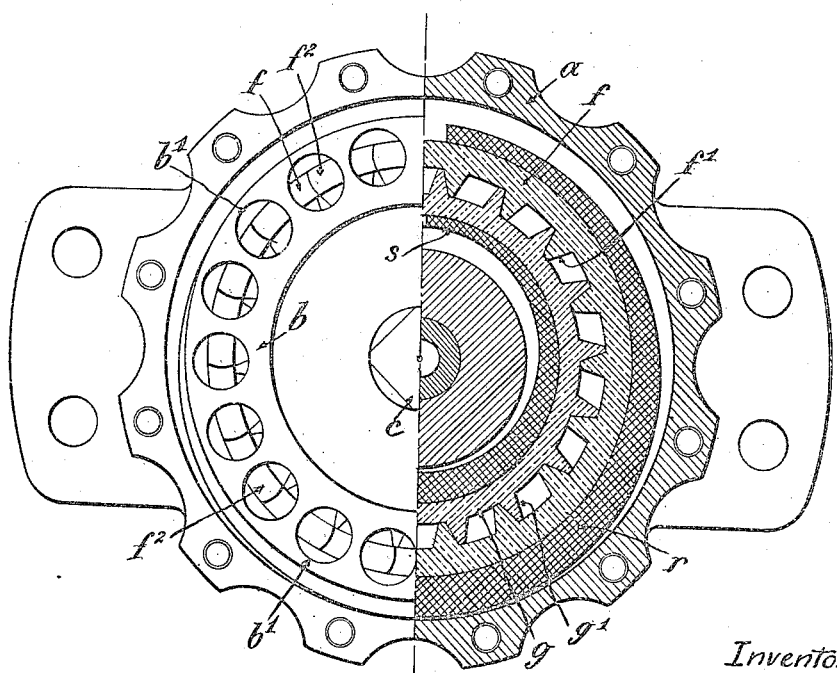
Fig. 2 shows in its left part an inner semi-view of the apparatus, the cover being removed, and in its right part a semi-section perpendicular to the axis taken on the line A—A of Fig. 3.

In the box $a$ are arranged concentrically to this box two toothed crown-wheels $f$ and $g$; the outer one $f$ with inner teeth $f^1$ and the inner one $g$ with outer teeth $g^1$; the teeth of one of the crown-wheels engage in the spaces between the teeth of the adjacent crown-wheel, but these intervals between two successive teeth are greater than the width of the teeth, as can be seen from the right hand part of Fig. 2, so that the two crown-wheels may have a relative movement of rotation before their teeth strike against each other.

Besides the outer toothed crown-wheel $f$ has projecting on its upper face tenons $f^2$ distributed over all its circumference.

The outer toothed crown-wheel $f$ is surrounded and compressed by a segment $r$ intended to form a brake on its periphery; this segment has a crescent-shaped outline and has on its inner edge a cylindrical claw $r^1$ with two flat-faces, which engages in a cylindrical cavity of similar diameter formed in the bottom of the box $a$, so that the said segment centered by the crown-wheel $f$ cannot rotate, while permitting an easy removal of the whole, segment $r$ and crown-wheel $f$, when the box is open, the said segment is bent open before being placed around the toothed crown-wheel $f$, so that when in place it presses on the latter with force.

In the same way the toothed crown-wheel $g$ is combined with a second segment brake $s$ of the same shape as the former, but this segment is placed within the crown-wheel and its ends have to be bent together to engage in this crown-wheel, so that once in place, it produces strong pressure on the whole inner cylindrical rim of the said crown-wheel. This segment has, like the former, a cylindrical claw $s^1$ with two flat faces which engages in a cylindrical cavity of the same diameter in the bottom of the fixed box, which prevents any rotation of the said spring around the axle of the box, while allowing the whole toothed crown-wheel $g$ and segment $s$, to be easily removed when the box is opened.

Finally the disk $b$ integral with the axle $c$ and which has been referred to at the commencement, has on its circumference round openings $b^1$ which correspond to the projecting tenons $f^2$ on the toothed crown-wheel $f$, but the diameter of these holes is slightly greater than the width of the tenons, so that, when the disk is in place and the tenons of the crown-wheel are engaged in its holes, the said disk can turn slightly to the right and to the left before the walls of the holes, on the one side or the other, strike against the corresponding tenons.

With such an arrangement, when the car frame approaches the axle, in consequence of the flattening more or less of the suspension springs of the car accordingly as the unevennesses of the road are greater or less, the following occurs:—

For slight unevennesses, that is to say, for slight flattening of the springs, the axle $c$ on which the lever connected with the axle is fixed only turns through a very small angle, so that the disk $b$ integral with the axle $c$ only turns through the same angle; the angle is insufficient for the sides of the holes of the disk to come into contact with the tenons $f^1$ and the brake system contained in the box is not put into action. There is therefore no braking of the suspension springs of the car during this period, so that for the very slight unevennesses, the suspension springs retain all their suppleness, which is desirable.

If the unevenness is more considerable, the angle described by the lever fixed to the axle $c$ being greater, the sides of the holes of the disk come into contact with the tenons and the disk $b$ draws by its rotation the large toothed crown-wheel $f$, which produces intense friction between the outer rim of this crown-wheel and the inner surface of the segment $r$ which remains compulsorily fixed in position as previously mentioned; there is consequently a braking action of the suspension springs of the car and consequent absorption of shocks and vibrations.

Finally if the unevenness is very considerable, when the toothed crown-wheel $f$ has turned to a given extent while producing the initial brake action above indicated, the inner teeth $f^1$ of the said crown-wheel, in their rotation meet the outer teeth $g^1$ of the crown-wheel $g$ and from this moment the two toothed crown-wheels turn simultaneously: consequently the friction produced by the rotation of the crown-wheel $f$ inside the segment $r$ is increased by the friction produced by the rotation of the crown-wheel around the second segment $s$.

There are consequently three stages in the working:

For very slight unevennesses, no brake action at all;

For moderate unevennesses the brake action due to the segment $r$;

And for the great unevennesses the double brake action produced by the segment $r$ and $s^1$.

By reason of the construction described, no shock is produced when the system passes from one position to another and that because of the great multiplicity of the points of attack and of their distribution all around the members which are to work. Besides, the friction is produced between metal on metal and on the whole cylindrical circumference of the two toothed crown-wheels, the segments and the circumferences of the crown-wheels being able to be perfectly turned so as to be exactly applied one against the other over the whole of their cylindrical surface.

The construction of the apparatus is completed by detail arrangements insuring especially the oiling of the frictional parts and the air-tightness of the apparatus which in practice is in the form of a box hermetically closed and filled with consistent lubricant.

To insure the lubrication of the metallic parts in friction, small grooves are formed over the whole extent of the outer surface of the wheel $f$ and similar grooves 2 on the inner surface of the wheel $g$. To insure airtightness of the box and otherwise avoid the vibration of the metallic parts contained in this box, there is arranged also at the spot where the axle $c$ passes through the lid $d$, a stuffing box formed of a leather washer 3 and a tightening nut 4. Between the inner face of the lid and the neighboring face of the disk $b$ two fiber washers 5 and 6 are arranged separated by an elastic washer of undulated steel plate 7. In the same way, between the inner face of the disk $b$ and the central shoulder $a^1$ of the box $a$ is arranged another fiber washer 8.

The inner part of the axle $c$ which engages in the shoulder $a^1$ of the box, is hollow and is provided with a small radial hole 9 for the lubrication. As to the outer part of the axle $c$, it will have preferably the section shown in Fig. 5 to receive the actuating lever.

Finally, for facilitating manufacture, the cylindrical holes reserved in the box $a$ for housing the axle $c$ and for housing the claws $r^1$ and $s^1$ of the segments pass completely through the bottom of this box and are then closed on the outer side by metallic disks 10, 11 and 12 beveled on their circumference and fixed by sinking in the metal of the box.

Of course the shapes and sizes of the members of the shock absorber and the details of construction may vary without departing from the domain of the invention. In the same way, the number of braking elements (toothed wheels and segments) may be increased.

Having now described my invention, what I claim as new and desire to secure by Letters Patent is:

1. In a shock absorber for automobiles or other suspended vehicles, a casing fixed on the car frame, a toothed crown-wheel having inner teeth, arranged in the said casing and in which the intervals between two successive teeth are greater than the width of the teeth, means connected to the suspension springs for driving the said toothed crown-wheel, a toothed crown-wheel having outer teeth, in which the intervals between two successive teeth are greater than the width of the teeth, and which is placed concentrically within the outer crown-wheel and is driven by it, a segment fixed to the casing and surrounding and compressing the cylindrical outer rim of the outer crown-wheel, a segment fixed to the casing, placed within the inner crown-wheel and compressing the inner cylindrical rim of the said crown-wheel, substantially as described and for the purpose set forth.

2. In a shock absorber for automobiles or other suspended vehicles, a casing fixed on the car frame, a toothed crown-wheel having inner teeth, arranged in the said casing and in which the intervals between two successive teeth are greater than the width of the teeth, the said toothed crown-wheel being provided with tenons, a driving disk housed in the casing provided on its circumference with holes of more width than the said tenons and which fits by its holes on these tenons, the said disk being integral with an axle centered in the casing and which issues from the latter through its lid to receive outside an actuating lever connected to the suspension springs, a toothed crown-wheel having outer teeth, in which the intervals between two successive teeth are greater than the width of the teeth and which is placed concentrically within the outer crown-wheel and is driven by it, a segment fixed to the casing and surrounding and compressing the cylindrical outer rim of the outer crown-wheel, a segment fixed to the casing placed within the inner crown-wheel and compressing the inner cylindrical rim of the said crown-wheel, substantially as described and for the purpose set forth.

3. In a shock absorber for automobiles or other suspended vehicles, a casing fixed on the car frame, a toothed crown-wheel having inner teeth, arranged in the said casing and in which the intervals between two successive teeth are greater than the width of the teeth, the said toothed crown-wheel being provided with small lubricating grooves formed over the whole extent of its outer surface, means connected to the suspension springs for driving the said toothed crown-wheel, a toothed crown-wheel having outer teeth, in which the intervals between two successive teeth are greater than the width of the teeth, and which is placed concentrically within the outer crown-wheel and is driven by it, the said toothed crown-wheel being provided with small lubricating grooves formed over the whole extent of its inner surface, a segment fixed to the casing and surrounding and compressing the cylindrical outer rim of the outer crown-wheel, a segment fixed to the casing placed within the inner crown-wheel and compressing the inner cylindrical rim of the said crown-wheel, substantially as described and for the purpose set forth.

4. In a shock absorber for automobiles or other suspended vehicles, a casing fixed on the car frame, a toothed crown-wheel having inner teeth, arranged in the said casing and in which the intervals between two successive teeth are greater than the width of the teeth, the said toothed crown-wheel being provided with tenons, a driving disk housed in the casing provided on its circumference with holes of more width than the said tenons and which fits by its holes on these tenons, the said disk being integral with an axle centered in the casing and the inner part of this axle being hollow and being provided with a small radial lubricating hole, while the outer part of the axle issues from the casing through its lid to receive outside an actuating lever connected to the suspension springs, a toothed crown-wheel having outer teeth, in which the intervals between two successive teeth are greater than the width of the teeth and which is placed concentrically within the outer crown-wheel and is driven by it, a segment fixed to the casing and surrounding and compressing the cylindrical outer rim of the outer crown-wheel, a segment fixed to the casing, placed within the inner crown-wheel and compressing the inner cylindrical rim of the said crown-wheel, substantially as described and for the purpose set forth.

5. In a shock absorber for automobiles or other suspended vehicles, a casing fixed on the car frame, a toothed crown-wheel having inner teeth arranged in the said casing and in which the intervals between two successive teeth are greater than the width of the teeth, the said toothed crown-wheel being provided with tenons, a driving disk housed in the casing, provided on its circumference with holes of more width than the said tenons and which fits by its holes on these tenons, the said disk being integral with an axle centered in the casing and which issues from the latter through its lid to receive outside an actuating lever connected to the suspension springs, a toothed crown wheel having outer teeth in which the intervals between two successive teeth are greater than the width of the teeth, and which is placed concentrically within the outer crown-wheel, and is driven by it, a segment fixed to the casing and surrounding and compressing the cylindrical outer rim of the outer crown-wheel, a segment fixed to the casing, placed within the inner crown wheel and compressing the inner cylindrical rim of the said crown-wheel, two fiber washers separated by an elastic washer of undulated steel plate arranged between the inner face of the lid of the casing and the neighboring face of the driving disk, a fiber washer arranged between the inner face of the driving disk and the central shoulder of the casing substantially as described and for the purpose set forth.

In testimony whereof I have signed my name to this specification in the presence of two subscribing witnesses.

JULES MICHEL MARIE TRUFFAULT.

Witnesses:
LOUIS MOSES,
CHAS. P. PRESSLY.

Copies of this patent may be obtained for five cents each, by addressing the "Commissioner of Patents, Washington, D. C."